(12) United States Patent
Thakkar et al.

(10) Patent No.: US 9,366,789 B2
(45) Date of Patent: Jun. 14, 2016

(54) MULTI-LAYER SEALING FILMS

(75) Inventors: Bimal V. Thakkar, Woodbury, MN (US); Jeffrey O. Emslander, Stillwater, MN (US); Bryan C. Feisel, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 587 days.

(21) Appl. No.: 13/701,339

(22) PCT Filed: May 12, 2011

(86) PCT No.: PCT/US2011/036300
§ 371 (c)(1),
(2), (4) Date: Jan. 17, 2013

(87) PCT Pub. No.: WO2011/152977
PCT Pub. Date: Dec. 8, 2011

(65) Prior Publication Data
US 2013/0114143 A1    May 9, 2013

Related U.S. Application Data

(60) Provisional application No. 61/350,269, filed on Jun. 1, 2010.

(51) Int. Cl.
*G02B 5/124* (2006.01)
(52) U.S. Cl.
CPC ......... *G02B 5/124* (2013.01); *Y10T 428/24562* (2015.01); *Y10T 428/24942* (2015.01)
(58) Field of Classification Search
CPC ...... G02B 5/124; G02B 5/122; G02B 5/0231; G02B 5/136

USPC .................................. 359/529–553
See application file for complete search history.

(56) References Cited

U.S. PATENT DOCUMENTS

| 3,684,348 A | 8/1972 | Rowland |
| 3,689,346 A | 9/1972 | Rowland et al. |
| 3,712,706 A | 1/1973 | Stamm et al. |
| 3,811,983 A | 5/1974 | Rowland et al. |

(Continued)

OTHER PUBLICATIONS

"Measurement of Web Curl", Proceedings of the Applied Webhandling Conference, AIMCAL 2006.

(Continued)

*Primary Examiner* — James Phan
(74) *Attorney, Agent, or Firm* — Trisha D. Adamson

(57) ABSTRACT

The present application generally relates to multi-layer sealing films, methods of making such films, materials for inclusion in such films, retroreflective sheeting and articles including such films, and methods of making retroreflective sheeting and articles including such films. The multi-layer sealing film may include two or more layers. One exemplary embodiment of a two-layer film includes a first layer including a thermoplastic polymeric material including reaction products of alkylene and reaction products of at least one non-acidic comonomer and a second layer including one of a polyolefin, a polyester, a polymethyl methacrylate, a polyamide, a polycarbonate, an ethylene-methacrylic acid, and a polyurethane. In some embodiments, at least one of the layers of the multi-layer sealing film has an elastic modulus of at least $3.5 \times 10^5$ kPa and the flexural rigidity of the retroreflective article is less than about $4.0 \times 10^{-8}$ N·m².

16 Claims, 1 Drawing Sheet

(56) References Cited

U.S. PATENT DOCUMENTS

| | | |
|---|---|---|
| 4,025,159 A | 5/1977 | McGrath |
| 4,202,600 A | 5/1980 | Burke et al. |
| 4,208,090 A | 6/1980 | Heenan |
| 4,243,618 A | 1/1981 | Van Arnam |
| 4,332,847 A | 6/1982 | Rowland |
| 4,576,850 A | 3/1986 | Martens |
| 4,588,258 A | 5/1986 | Hoopman |
| 4,601,861 A | 7/1986 | Pricone et al. |
| 4,775,219 A | 10/1988 | Appeldorn et al. |
| 4,801,193 A | 1/1989 | Martin |
| 4,938,563 A | 7/1990 | Nelson et al. |
| 5,117,304 A | 5/1992 | Huang et al. |
| 5,272,562 A | 12/1993 | Coderre |
| 5,450,235 A | 9/1995 | Smith et al. |
| 5,468,781 A * | 11/1995 | Sugano et al. ............ 521/60 |
| 5,491,486 A | 2/1996 | Welles, II et al. |
| 5,601,911 A | 2/1997 | Ochi et al. |
| 5,642,222 A | 6/1997 | Phillips |
| 5,691,846 A | 11/1997 | Benson, Jr. et al. |
| 5,784,197 A | 7/1998 | Frey et al. |
| 5,905,099 A | 5/1999 | Everaerts et al. |
| 5,930,041 A | 7/1999 | Thielman |
| 5,936,770 A | 8/1999 | Nestegard et al. |
| 5,988,820 A | 11/1999 | Huang et al. |
| 6,004,422 A | 12/1999 | Janovec et al. |
| 6,039,909 A | 3/2000 | Bernard et al. |
| 6,142,643 A | 11/2000 | Araki et al. |
| 6,318,867 B1 | 11/2001 | Bacon et al. |
| 6,428,889 B1 | 8/2002 | Nagaoka |
| 6,677,028 B1 | 1/2004 | Lasch et al. |
| 7,329,447 B2 | 2/2008 | Chirhart et al. |
| 7,442,442 B2 | 10/2008 | Strobel et al. |
| 7,611,251 B2 | 11/2009 | Thakkar et al. |
| 7,862,187 B2 | 1/2011 | Thakkar et al. |
| 2002/0110667 A1 | 8/2002 | Kaufman |
| 2006/0038865 A1 | 2/2006 | Nagasaki et al. |

OTHER PUBLICATIONS

DuPont™ Elvaloy® 4924 ethylene copolymer resin, Product Data Sheet.
DuPont™ Surlyn® 1705-1 data sheet.
DuPont™ Elvax® 3134Q data sheet.
DuPont™ Elvax® 3124 data sheet.
DuPont™ Elvax® 3170 data sheet.
DuPont™ Elvax® 3190 data sheet.
DuPont™ Bynel® 3100 Series adhesive resins data sheet.
DuPont™ Bynel® 21E533 data sheet.
DuPont™ Bynel® 22E757 Series Modified Ethylene Acrylate data sheet.
DuPont™ Bynel® Series 2000 adhesive resins data sheet.

* cited by examiner

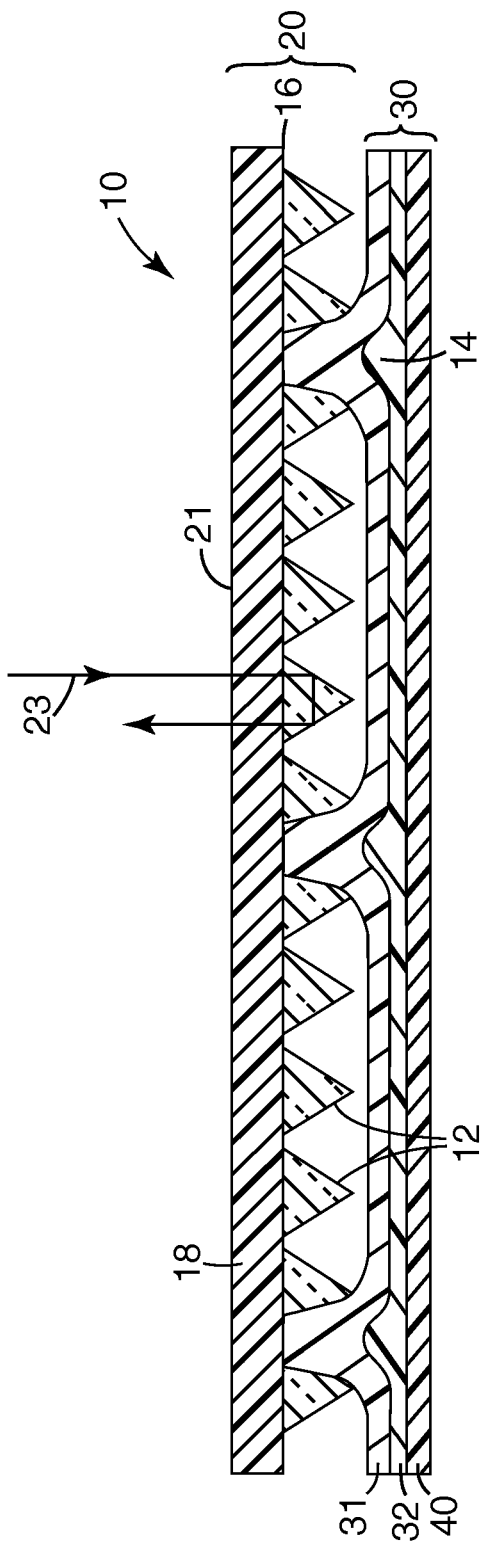

MULTI-LAYER SEALING FILMS

TECHNICAL FIELD

The present application generally relates to sealing films, methods of making sealing films, materials for inclusion in sealing films, retroreflective sheeting and articles including sealing films, and methods of making retroreflective sheeting and articles including sealing films.

BACKGROUND

Retroreflective sheetings have the ability to redirect incident light towards its originating source. This ability has led to the wide-spread use of retroreflective sheetings on a variety of articles including, for example, traffic signs and license plates. There are essentially two types of retroreflective sheeting: beaded sheeting and cube corner sheeting. Beaded sheeting employs a multitude of glass or ceramic microspheres to retroreflect incident light. Cube corner sheeting employs a multitude of rigid, interconnected, cube corner elements to retroreflect incident light.

In cube corner sheeting, a specular reflective coating (e.g., a metallic coating) can be placed on the backside of the cube corner elements to promote retroreflection. Enhanced retroreflection can also be achieved by applying a sealing film or layer to the back side of the cube corner elements either in addition to or in lieu of the metallic coating. The sealing film creates and maintains an air interface at the backside of the cube corner elements and thereby enhances retroreflectivity. Sealing films can also be employed to impart color or protect the cube corner elements from environmental factors. Various sealing films suitable for use with flexible retroreflective sheeting have been described (see, for example, U.S. Pat. No. 5,784,197 (Frey); U.S. Pat. No. 5,691,846 (Benson); U.S. Pat. No. 6,318,867 (Bacon); and U.S. Pat. No. 7,611,251 (Thakkar), all assigned to the present assignee).

SUMMARY

One embodiment of the present disclosure is a retroreflective article, comprising: a plurality of cube corner elements; and a multi-layer sealing film at least a portion of which is adhered to at least some of the plurality of cube corner elements such that the multi-layer sealing film maintains an air interface between the cube corner elements and the multi-layer sealing film, wherein the multi-layer sealing film includes: a first sealing film layer comprising a thermoplastic polymeric material including reaction products of alkylene in an amount of at least about 50% by weight and reaction products of at least one non-acidic comonomer in an amount of less than 25% by weight; and a second sealing film layer including at least one of a polyolefin, a polyester, a polymethyl methacrylate, a polyamide, a polycarbonate, an ethylene-methacrylic acid, and a polyurethane. In one embodiment, the retroreflective article further includes third sealing film layer comprising a thermoplastic polymeric material including reaction products of alkylene in an amount of at least about 50% by weight and reaction products of at least one non-acidic comonomer in an amount of less than 25% by weight. In one embodiment, the second sealing film layer includes at least one of polypropylene, high density polyethylene, and PET. In one embodiment, the retroreflective article has a coefficient of retroreflection of at least about 50 cd/lux·m$^2$ at a 0.2° observation angle and a −4° entrance angle when subjected to a load of about 53 kg/m. In one embodiment, the retroreflective article has a curvature of less than about 50 mm in a downweb direction when subjected to solvent vapors for at least 30 minutes. In one embodiment, the retroreflective article has a flexural rigidity that is less than about $4.0 \times 10^{-8}$ N·m$^2$. In one embodiment, at least one layer of the multi-layer sealing film has an elastic modulus that is greater than about $3.5 \times 10^5$ kPa.

Yet another embodiment of the present disclosure is a microstructured article comprising: a plurality of microstructured elements; and a multi-layer sealing film adhered to portions of the microstructured elements such that the multi-layer sealing film maintains an air interface between the microstructured elements and the multi-layer sealing film; wherein at least one of the layers of the multi-layer sealing film has an elastic modulus of at least about $3.5 \times 10^5$ kPa and the microstructured article has a flexural rigidity that is less than about $4.0 \times 10^{-8}$ N·m$^2$.

Yet another embodiment of the present disclosure is a multi-layer sealing film, comprising: a first sealing film layer comprising a thermoplastic polymeric material including reaction products of alkylene in an amount of at least about 50% by weight and reaction products of at least one non-acidic comonomer in an amount of less than 25% by weight; and a second sealing film layer including at least one of a polyolefin, a polyester, a polymethyl methacrylate, a polyamide, a polycarbonate, an ethylene-methacrylic acid, and a polyurethane; wherein at least one layer of the multi-layer sealing film has an elastic modulus that is greater than about $3.5 \times 10^5$ kPa. In one embodiment, at least a portion of the multi-layer sealing film is adhered to at least a portion of a microstructured surface including a plurality of cube corner elements, the multi-layer sealing film maintaining an air interface between the cube corner elements and the multi-layer sealing film. In one embodiment, the multi-layer sealing film further comprises a third sealing film layer comprising a thermoplastic polymeric material including reaction products of alkylene in an amount of at least about 50% by weight and reaction products of at least one non-acidic comonomer in an amount of less than about 25% by weight. In one embodiment, the second sealing film layer includes at least one of polypropylene, high density polyethylene, and PET.

BRIEF DESCRIPTION OF DRAWING

FIG. 1 is a schematic side view of one exemplary retroreflective sheeting of the type described generally in the present application.

DETAILED DESCRIPTION

The inventors of the present application recognized some disadvantages of existing sealing films and retroreflective or optical constructions including existing sealing films. One disadvantage is that when a solvent-based adhesive is used against some types of sealing film, the lay-flat properties of the sealing film, and sometimes the resulting retroreflective construction, suffer. It is theorized that the residual solvent in the solvent-based adhesive interacts with the sealing film, causing it (or portions of it) to swell and thus curl. This curling is disadvantageous. For example, accurate application of sheeting with a sealing film exhibiting curling to a flat, uncurled retroreflective article (e.g., sheeting) is challenging. Also, retroreflective sheeting including a sealing film that exhibits curling often exhibits edge separation and/or lifting of the sealing film from the retroreflective sheeting. Also, the adhesion of curled sealing film to retroreflective sheeting can cause curling of the retroreflective sheeting, which can complicate downstream manufacturing or printing processes such as, for example, screen printing, and which can impair the optical performance of the retroreflective sheeting.

Another disadvantage that the inventors of the present application recognized is that some retroreflective sheeting that includes the currently available sealing films stretches easily during application. While this extensibility may be desired for application of the retroreflective sheeting to a curved plastic device, the extensibility can cause the retroreflective sheeting to lose brightness at low observation angles. For example, in some instances, at low strain levels (<1%), the brightness at the 0.2 observation angle/−4 entrance angle drops around 10%. This decrease in brightness increases significantly at higher strain levels. The inventors of the present application recognized this disadvantage and the need for a retroreflective sheeting that is not susceptible to significant brightness loss during application.

Consequently, the inventors of the present application saw a need for a retroreflective article, microstructured article, construction, film, or sheeting having improved lay-flat properties that exhibits decreased curling during application while maintaining its brightness. The inventors of the present application recognized that decreased curling and improved lay-flat properties result from, for example, the use of a more rigid sealing film. However, the use of a sealing film having increased rigidity typically results in a retroreflective sheeting exhibiting decreased conformability to flexible substrates (e.g., canvas and other fabrics, corrugated and riveted surfaces, and curved surfaces having a simple or compound curve such as plastic drums and cones). Meanwhile, use of a sealing film that has too little rigidity results in a retroreflective sheeting whose brightness decreases substantially if stretched during application. Consequently, the inventors of the present application had to look at new and novel sealing film materials and processes as well as new and novel materials and processes to adhere and attach the sealing films to retroreflective articles, microstructured constructions, films, sheeting, and constructions.

The present application generally relates to microstructured and/or retroreflective articles including a sealing film (also referred to as a sealing film layer, seal film, or seal layer) that covers at least a portion of the microstructured surface. The term "microstructure" is used herein as defined and explained in U.S. Pat. No. 4,576,850 (Martens), which is incorporated herein by reference. The microstructures may be provided, for example, on a flexible body layer or on a rigid body layer. The microstructures can be coupled or decoupled. Alternatively, the body layer may be integral with the microstructures. In at least some embodiments, the microstructures and the body layer are light transmissive. The body layer can be made of the same material used to make the microstructures, or the body layer can be made of a different material. In some embodiments, the sealing film is bonded to portions of the land layer, the body layer, and/or to at least a portion of the microstructured elements. Although the present disclosure will be described with reference to retroreflective sheeting, the sealing film described herein may be suitable for bonding to other microstructured surfaces as well.

FIG. 1 is a schematic side view of an exemplary retroreflective sheeting 10 including a retroreflective portion 20 and a multi-layer sealing film 30. Retroreflective portion 20 includes cube corner elements 12 and a body layer 18. Body layer 18 may also be referred to as an overlay film or a base substrate. Cube corner elements 12 project from a first major surface 16 (also referred to as the rear side) of body layer 18. In the exemplary embodiment shown in FIG. 1, body layer 18 is the outermost layer on the front side of retroreflective sheeting 10. As shown in FIG. 1, a light ray 23 enters retroreflective sheeting 10 through the front surface 21 of retroreflective sheeting 10. Light ray 23 then passes through body portion 18, strikes the planar faces of adjacent cube corner elements 12, and returns in the direction from which it came, as shown by the directional arrows in FIG. 1. Body layer 18 functions to protect retroreflective sheeting 10 from outdoor environmental elements and/or provides mechanical integrity to retroreflective sheeting 10. A network of narrow intersecting bonds 14 extend over at least a portion of the sheeting. The pattern of sealing regions or legs thereby creates cells. The sealing regions can form various patterns that may be, for example, contiguous polygons, such as, for example, parallelograms, triangles, and hexagons.

As shown, cube corner elements 12 are disposed as matched pairs in an array on one side of sheeting 10. Each cube corner element 12 has the shape of a trihedral prism with three exposed planar faces. The planar faces may be substantially perpendicular to one another (as in the corner of a room) with the apex of the prism vertically aligned with the center of the base (see, for example, U.S. Pat. No. 3,684,348 (Rowland)). The angle between the faces typically is the same for each cube corner element in the array and will be about 90 degrees. The angle, however, can deviate from 90 degrees as is well-known (see, for example, U.S. Pat. No. 4,775,219 (Appledorn)). The apex also may be canted to the center of the base as disclosed in U.S. Pat. No. 4,588,258 (Hoopman). Canted cube corner element configurations can provide wide angle retroreflection among multiple viewing planes. The present disclosure is not limited to any particular cube corner geometry. Various cube corner configurations are known such as described in U.S. Pat. No. 4,938,563 (Appeldorn), U.S. Pat. No. 4,775,219 (Appeldorn), U.S. Pat. No. 4,243,618 (Van Arnam), U.S. Pat. No. 4,202,600 (Burke), and U.S. Pat. No. 3,712,706 (Stamm).

Multi-layer sealing film 30 is bonded to the structured surface formed by cube corner elements 12. Multi-layer sealing film 30 facilitates maintenance of an air interface with cube corner elements 12 and thereby enhances retroreflectivity. Multi-layer sealing film 30 can also impart color or protect cube corner elements 12 from environmental factors. Multi-layer sealing film 30 of FIG. 1 includes three layers: a first sealing film layer 31; a second sealing film layer 32, and a third sealing film layer 40. First sealing film layer 31 is a thermoplastic polymeric material comprising reaction products of alkylene in combination with reaction products of at least one non-acidic monomer. Second sealing film layer 32 layer may also comprise reaction products of alkylene in an amount of at least about 50% in combination with reaction products of vinyl acetate, alkyl (meth)acrylate monomers, and mixtures thereof. The composition of the second sealing film layer can be the same or different than the first sealing film layer. Third sealing film layer 40 includes at least one of a polyester, polyolefin, polyamide, polycarbonate, polymethyl methacrylate, ethylene-methacrylic acid, or polyurethane.

In at least some embodiments, a tie layer (not shown) may be provided between any or all of sealing film layers 31, 32, and/or 40. In at least some embodiments, the multi-layer sealing film is two layers. One such implementation includes a first sealing film layer that is a thermoplastic polymeric material comprising reaction products of alkylene in combination with reaction products of at least one non-acidic monomer and a second sealing film layer that includes at least one of a polymer, polyester, polyolefin, polyamide, polycarbonate, polymethyl methacrylate, ethylene-methacrylic acid, or polyurethane.

First sealing film layer 31 is a thermoplastic polymeric material comprising reaction products of alkylene in combination with reaction products of at least one non-acidic monomer. The alkylene component of the first sealing film layer is preferably low cost and provides durability (e.g., chemical resistance and cold temperature impact resistance) to the sealing film. The amount of alkylene in the first sealing film layer is preferably at least about 50% by weight (wt-%), at least 55 wt-%, at least 60 wt-%, at least 65% wt-%, at least 70 wt-%, at least 75 wt-%, or at least 80 wt-%. Alkylene components having two (i.e., ethylene) to eight (i.e., octene) carbon atoms may be employed, with ethylene and (iso)propylene being preferred. The non-acidic monomer improves the adhesion of the sealing film to the body layer, land layer, and/or cube corner elements. The non-acidic monomer reaction products typically total at least about 1 wt-% and more typically at least about 10 wt-%. Further, the total amount of non-acidic comonomer reaction products is generally less than about 40 wt %. In some embodiments, the total amount of non-acidic comonomer reaction products is less than about 32 wt-%, or less than about 25 wt-%, particularly when the sealing film is monolithic (i.e., a single layer)). The elastic modulus of the first sealing film layer is preferably less than $3.5 \times 10^8$ Pa. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 inch/minute) rate of grip separation.

In some embodiments, the first sealing film layer may include a blend of at least two different thermoplastic polymers. The thermoplastic polymers of the blend may differ with respect to the type of comonomer and/or the amount of comonomer and/or the molecular weight (e.g., melt flow index). In some embodiments, the blend may include two or more homopolymer(s), copolymer(s), or terpolymers(s). In such embodiments, the blend comprises reaction products of alkylene in an amount of at least about 50% in combination with reaction products of vinyl acetate, alkyl (meth)acrylate monomers, and mixtures thereof. In some aspects, each of the polymers of the blend comprise reaction products of alkylene in an amount at least about 50% in combination with reaction products of vinyl acetate, alkyl (meth)acrylate monomers, and mixtures thereof.

Additional information about the first sealing film layer can be found, for example, in U.S. Pat. No. 7,611,251, incorporated by reference herein.

The second sealing film layer may also comprise reaction products of alkylene in an amount of at least about 50% in combination with reaction products of vinyl acetate, alkyl (meth)acrylate monomers, and mixtures thereof. The composition of the second sealing film layer can be the same or different than the first sealing film layer. As such, the information provided above regarding the first sealing film layer also applies to the second sealing film layer. In embodiments where the second sealing film layer differs from the first sealing film layer, the second sealing film layer may have, for example, a different composition, a different melt flow index, a higher alkylene content, and/or different additives (e.g., pigment) than the first sealing film layer. In some embodiments, the elastic modulus of the second sealing film layer is preferably less than $3.5 \times 10^8$ Pa.

Third sealing film layer 40 includes at least one of a polymer, polyester, polyolefin, polyamide, polycarbonate, polymethyl methacrylate, ethylene-methacrylic acid, or polyurethane. Exemplary preferred materials include polypropylene, high density polyethylene, and polyethylene (PET). The elastic modulus of the third sealing film layer is preferably greater than $3.5 \times 10^8$ Pa. In at least some embodiments, the third sealing film layer has an elastic modulus of at least three times that of the first and second sealing film layers, or at least four times that of the first and second sealing film layers, or at least five times that of the first and second sealing film layers.

In a retroreflective article or multi-layer sealing film construction that only includes two sealing film layers, the "third sealing layer" as described in the previous paragraph will be the second sealing layer.

In at least some embodiments, the third sealing film layer offers at least one of the following features: (1) an increased elastic modulus of the multi-layer sealing film and/or an increased rigidity of the multi-layer sealing film, which may minimize stretching of the retroreflective sheeting during processing and application; (2) the third sealing film layer may be capable of being processed with the first and/or second sealing film layers, thereby providing a lower cost multi-layer sealing film; (3) the third sealing film layer may be capable of withstanding embossing roll temperatures in excess of 250° F.; and/or (4) the third sealing film layer may provide increased solvent resistance and/or minimize sheeting curl.

In at least some embodiments, the first and second sealing film layers can be a single layer or can be more than two layers. Also, although multi-layer films are discussed as having distinct layers, it will be appreciated that there may be both physical and chemical interaction between the layers and this is still within the scope of the present disclosure. For example, post-processing of the multi-layer films, such as by post heating or thermal fusing, may cause the layers to become less distinct depending on the conditions used.

One exemplary illustrative sealing film composition includes a clear modified EVA (e.g., commercially available Bynel 3101 sold by Dow Corning) as the first sealing film layer; a pigmented modified EVA (e.g., Bynel 3101 combined with a pigmented mixture consisting of 20 wt % of the EVA resin and 80 wt % $TiO_2$, commercially available from Polyone, Avon Lake, Ohio under the trade designation "4048 White VAC," as described in U.S. Pat. No. 7,611,251) as the second sealing film layer; and a stiffer material (e.g., an olefin such as, for example, HDPE or PET) as the third sealing film layer. Another exemplary illustrative sealing film composition includes a clear modified EVA (e.g., commercially available Bynel 3101 sold by Dow Corning) as the first sealing film layer; a stiffer material (e.g., an olefin such as, for example, HDPE or PET) as the second sealing film layer; and a pigmented modified EVA (e.g., the pigmented Bynel 3101 described above) as the third sealing film layer. Another exemplary illustrative sealing film composition includes a clear modified EVA (e.g., commercially available Bynel 3101 sold by Dow Corning) as the first sealing film layer; a stiffer, pigmented material (e.g., a pigmented olefin such as, for example, HDPE or PET) as the second sealing film layer; and a clear or pigmented modified EVA (e.g., the pigmented Bynel 3101 described above) as the third sealing film layer. Another exemplary illustrative sealing film composition includes a clear modified EVA (e.g., commercially available Bynel 3101 sold by Dow Corning) as the first sealing film layer and a stiffer, pigmented material (e.g., a pigmented olefin such as, for example, HDPE or PET) as the second sealing film layer. Another exemplary illustrative sealing film composition includes a clear modified EVA (e.g., commercially available Bynel 3101 sold by Dow Corning) as the first sealing film layer and a stiffer material (e.g., an olefin such as, for example, HDPE or PET) as the second sealing film layer. This last sealing film is translucent/clear because none of its layers are pigmented.

In general, for all of the illustrative examples described above, the clear layer adheres to the microstructured surface, the pigmented layer provides the desired cap-Y, and the stiffer layer provides the desired rigidity and/or elastic modulus. While the stiffer layer can be either the second or third sealing film layer, use of the stiffer layer as the third layer may provide enhanced solvent resistance. These illustrative exemplary embodiments also show that the order of the sealing film layers can be varied. For example, the "third sealing film layer" can be between the first and second sealing film layers. As such, the terms "first," "second," and "third"—with respect to the sealing film layers—are not indicative of order of the layers in the multi-layer construction. Also, because the multi-layer sealing films of the present disclosure can include two, three, or more than three layers, the use of the terms "first," "second," and "third" is arbitrary. For example, in a sealing film with two layers, the first of the two layers could be, for example, what is described as the "second sealing film layer" herein and the second layer could be, for example, what is described as the "third sealing film layer" herein.

At least some embodiments, at least one layer of the multi-layer sealing film of the present disclosure preferably has an elastic modulus that is greater than about $3.5\times10^5$ kPa. In at least some embodiments, at least one layer of the multi-layer sealing film has an elastic modulus of at least $3.5\times10^5$ kPa, or at least $5.0\times10^5$ kPa, or at least $8.0\times10^5$ kPa, or at least $10\times10^5$ kPa, or at least $20\times10^5$ kPa, or at least $38\times10^5$ kPa. In some embodiments, at least one layer of the multi-layer sealing film has an elastic modulus that is between about $3.5\times10^5$ kPa and about $50\times10^5$ kPa.

Some embodiments of the multi-layered sealing film layer of the present disclosure have a relatively low glass transition temperature for cold temperature flexibility and impact resistance. In some embodiments, the Tg of the first two layers of the multi-layer sealing film is less than 25° C., or less than 20° C., or less than 15° C., or less than 10° C. Notably, not all embodiments have a low Tg. For example, where the third sealing film layer includes one or more olefins, the third sealing film layer will have a low Tg and a high elongation to break. In contrast, where the third sealing film layer includes PET, the third sealing film layer will have a higher Tg and a lower elongation to break. In the exemplary embodiment including PET, the third sealing film layer is sufficiently thin to ensure an elastic modulus and/or rigidity within the desired range.

Some embodiments of the multi-layer sealing film have a melt index of less than 25 g/10 min as measured according to ASTM D 1238. Alkylene copolymers with high comonomer contents and melt indices are generally more readily melt bonded. However, excessively high melt indices can result in diminished retroreflective performance.

The seal film, cube corner, or body layer composition may optionally include one or more reactive (e.g., ethylenically unsaturated) ingredients and/or one or more non-reactive ingredients. Various additives such as chain transfer agents, colorants (e.g., dyes), antioxidants, light stabilizers, UV absorbers, processing aids such as antiblocking agents, releasing agents, lubricants, and other additives may be added to the body portion, cube corner elements, or sealing film, as described in U.S. Pat. No. 5,450,235 (Smith), incorporated herein by reference.

In some embodiments, the multi-layer sealing film further includes at least one pigment, dye, or combination thereof. For example, various opacifying agents can be employed in the sealing film to improve the whiteness of the sheeting. In at least some embodiments, it is preferred to incorporate from about 5 wt-% to about 30 wt-% of a white pigment into the sealing film. A pigment mixture of 20 wt-% of an EVA resin with 80 wt-% $TiO_2$ commercially available from PolyOne Corporation, Avon Lake, Ohio under the trade designation "4048 White VAC" is particularly suitable for addition to ethylene vinyl acetate copolymer based sealing films. Since the inclusion of pigment can reduce adhesion, it is also contemplated to make a multi-layer sealing film wherein the sealing film layer contacting the land layer, body layer, or cube corner elements is light transmissive and/or non-pigment containing and one or more other sealing film layers includes pigment.

The multi-layer sealing films and retroreflective articles described herein can be extruded, co-extruded, or made by multilayered cast or blown film processes.

Cube corner retroreflective sheeting of the types described herein can be made by: (a) forming a plurality of cube corner elements from a light transmissible material; (b) securing a body layer to the plurality of cube corner elements; and (c) securing a multi-layer sealing film of the type described herein to the backside of the cube corner elements. In some embodiments, a specular reflective coating may be applied to the backside of the cube corner elements. Retroreflective articles, microstructured articles, and sheeting of the types generally described herein can be made according to a variety of methods. Some exemplary methods include those described in, for example, U.S. Pat. No. 3,689,346 (Rowland); U.S. Pat. No. 3,811,983 (Rowland); U.S. Pat. No. 4,332,847 (Rowland); U.S. Pat. No. 4,601,861 (Pricone); U.S. Pat. No. 5,491,586 (Phillips); U.S. Pat. No. 5,642,222 (Phillips) and U.S. Pat. No. 5,691,846 (Benson), all of which are incorporated herein by reference.

In some embodiments, the cube corner retroreflective sheeting includes a land layer, such as shown in U.S. Pat. No. 5,450,235 (Smith). In some embodiments, the retroreflective sheeting includes a land layer that has a thickness between about 0 and about 1000 micrometers, more preferably between about 0 and about 150 micrometers. In some embodiments, the land layer has a thickness of less than 250 micrometers, less than 200 micrometers, less than 200 micrometers, less than 150 micrometers, less than 100 micrometers, less than 50 micrometers, less than 25 micrometers, less than 15 micrometers, or less than 10 micrometers.

Various polymeric film substrates comprised of various thermosetting or thermoplastic polymers are suitable for use as the land layer or the body layer. Where a body layer is present, the body layer may be a single layer or multi-layer film. The body layer may be, for example, an olefinic polymeric material, typically comprising at least 50 wt-% of an alkylene having 2 to 8 carbon atoms with ethylene and propylene being most commonly employed. Illustrative examples of polymers that can be used as the body layer are described in U.S. Pat. No. 7,611,251 (Thakkar), incorporated herein by reference.

For embodiments wherein the microstructured article is flexible, one exemplary body layer is a low elastic modulus polymer capable of bending, curling, flexing, conforming, and/or stretching. In some embodiments, the body layer has an elastic modulus of less than $13\times10^8$ Pa, less than $7\times10^8$ Pa, less than $5\times10^8$ Pa, or less than $3.5\times10^8$ Pa. In some embodiments, the body layer has a glass transition temperature that is less than 25° C. In some embodiments, the body layer has a Vicat softening temperature of at least 50° C. In some embodiments, the body layer has a thickness that is less than about 1000 micrometers. Preferred polymeric materials used in the body layer or land layer are resistant (or are combined with stabilizing materials to become resistant) to degradation by UV radiation so that the retroreflective sheeting can be used for long-term outdoor applications.

In at least some preferred embodiments, the retroreflective article described herein has a flexural rigidity that is less than about $4.0\times10^{-8}$ N·m². In some embodiments, the retroreflective sheeting described herein has a flexural rigidity of less than about $3.5\times10^{-8}$ N·m², or less than about $2.0\times10^{-8}$ N·m², or less than about $1.5\times10^{-8}$ N·m². In some embodiments, the flexural rigidity is between about $1.5\times10^{-8}$ N·m² and about $4.0\times10^{-8}$ N·m².

In embodiments where the retroreflective sheeting is flexible, the sheeting may not include a land layer or the land layer may be of minimal thickness. In some such embodiments, the land layer may have a thickness in the range of about 0 to about 150 micrometers, and preferably in the range of about 0 to about 100 micrometers. The thickness of the land layer is preferably no greater than 10 percent of the height of the cube corner elements, and more preferably about 0 to 5 percent thereof. In sheetings having a thicker land layer, it is typically more difficult to achieve decoupling of individual cube corner elements.

The cube corner elements typically have a height in the range of about 20 to 500 micrometers, and more typically in the range of about 35 to 100 micrometers. The cube corner elements tend to be hard and rigid. The polymeric composition may be thermoplastic, yet (particularly in the case of flexible retroreflective sheeting) may be a reaction product of a polymerizable (i.e., crosslinkable) resin. The elastic modulus of the composition of the cube corner elements is typically greater than $16\times10^8$ pascals (Pa), preferably greater than $18\times10^8$ Pa, and more preferably is greater than $25\times10^8$ Pa. Exemplary illustrative examples of materials (including, but not limited to, thermoplastic polymers) that can be used to form the cube corner elements are described in U.S. Pat. No. 7,611,251 (Thakkar), incorporated herein by reference.

During curing or solidification of the cube corner composition, depending on the composition of the cube corner material, individual cube corner elements may experience a certain degree of shrinking. If the elastic modulus of the sealing film is too high, torsional stresses can be applied to the cube corner elements if they shrink during curing. If the stresses are sufficiently high, then the cube corner elements can become distorted with a resulting degradation in optical performance. When the elastic modulus of the sealing film is sufficiently lower than the elastic modulus of the cube corner element material, the sealing film can deform along with the shrinking of cube corner elements without exerting such deformational stresses on the cube corner elements that would lead to undesirable degradation of the optical characteristics. Consequently, thermoplastic compositions employed for forming the cube corner elements typically have a low linear mold shrinkage, i.e., less than 1 percent. In some embodiments, the resin will shrink at least 5 percent by volume when cured, more preferably between 5 and 20 percent by volume, when cured. The use of resin compositions that shrink is amenable to obtaining minimal or no land thickness.

The elastic modulus differential between the sealing film and the cube corner elements is typically on the order of at least $1.0\times10^7$ Pa to $1.5\times10^7$ Pa. As the height of the cube corner elements diminishes, it is possible for this elastic modulus differential to reach the low end of this range presumably because the smaller cube corner elements do not undergo as great of shrinkage during curing.

A specular reflective coating such as a metallic coating can also optionally be placed on the backside of the cube corner elements to promote retroreflection. The metallic coating can be applied by known techniques such as vapor depositing or chemically depositing a metal such as aluminum, silver, or nickel. A primer layer may be applied to the backside of the cube corner elements to promote the adherence of the metallic coating. The retroreflective sheeting can also include a seal coat as described in U.S. Pat. No. 5,784,197 (Frey), a backing and/or an adhesive layer on the sealing film. These coatings facilitate adherence of the retroreflective sheeting to a substrate.

The multi-layer sealing film may be bonded in whole or in part to some or all of the cube corner elements. In some exemplary embodiments, the multi-layer sealing film can be adhered, at least in part, directly to the body layer between independent cube corner elements. Illustrative examples of sealing techniques include radio frequency welding, a conductive heat sealing process, ultrasonic welding, and reactive components, e.g., a sealing material that will develop a bond to the overlay film. Selection of a sealing approach will depend in large part on the nature of the sealing film and the body layer.

The sealing films described herein, particularly, the monolithic films lend themselves well to fusing via relatively simple and commonly available thermal techniques. The general practice followed in the art for sealing a thermoplastic layer to a retroreflective cube corner material is to use thermal embossing techniques which result in a form of "chain link" pattern of sealed zones which create sealed pockets of a plurality of individual cube corner elements. Closer inspection of a portion of a leg or "link" of a thermally sealed area indicates that for thermoplastic cube corner elements, the thermal fusion process results in significant distortion of the cube corner elements in fusion zones. This type of thermal distortion of the sealing legs typically extends well beyond the zone of actual sealing due to conductive effects. If an appreciable number of individual cube corner elements in the material are so distributed, the overall optical properties of the sheeting can decrease significantly, e.g., 30 to 40 percent, in comparison to unsealed sheeting.

Radio frequency ("RF") welding is an alternative to thermal fusion. When a radio frequency field is applied to a thermoplastic polymer with polar groups, the tendency of the polar groups to switch orientation in phase with the radio frequency determines the degree to which RF energy is absorbed and converted to kinetic motion of the polar group. This kinetic energy is conducted as heat to the entire polymer molecule; if enough RF energy is applied, the polymer will heat sufficiently to melt.

The interface between the retroreflective portion and the sealing film may include an adhesion promoting surface treatment and/or an adhesion promoting agent. Various adhesion promoting surface treatments are known and include for example, mechanical roughening, chemical treatment, (air or inert gas such as nitrogen) corona treatment (such as described in U.S. Pat. No. 7,442,442 (Strobel)), plasma treatment, flame treatment, and actinic radiation. Alternatively or in addition thereto, the adhesion promoting surface treatment may include the application of a tie layer or primer layer. For example, a polyurethane primer layer can be employed by coating and drying an aliphatic polyester urethane dispersion commercially available from K.J. Quinn & Co., Seabrook, N.H. under the trade designation "QC 4820". The interfaces may comprise any combination of adhesion promoting surface treatments.

A common method for improving the uniformity of total light return (TLR) with respect to orientation is tiling, i.e., placing a multiplicity of small tooling sections in more than one orientation in the final production, as described for example in U.S. Pat. No. 4,243,618 (Van Arnam); U.S. Pat.

No. 4,202,600 (Burke); and U.S. Pat. No. 5,936,770 (Nestegard et al.). The resulting sheeting has a first array of cube corner elements having a different orientation than an adjacent array of cube corner elements.

The retroreflective sheeting is useful for a variety of uses such as traffic signs, pavement markings, vehicle markings and personal safety articles, in view of its flexibility is combination with retroreflected brightness. The coefficient of retroreflection, $R_A$, may be measured according to US Federal Test Method Standard 370 at −4° entrance, 0° orientation, at various observation angles. Some embodiments of retroreflective sheeting of the type described herein may has a coefficient of retroreflection, $R_A$, at −4° entrance, 0° orientation, and an observation angle of 0.2° of at least 50 candelas/lux/m², at least 100 candelas/lux/m², at least 150 candelas/lux/m², at least 200 candelas/lux/m², or at least 250 candelas/lux/m². Due to the flexibility of the retroreflective sheeting, the sheeting may be amenable for application to flexible substrates such as canvas and other fabrics, corrugated and riveted surfaces, as well as curved surfaces having a simple or compound curve. The flexible retroreflective sheeting is also amenable for application to devices subject to thermal expansion and contraction (e.g., traffic devices such as barrels, cones).

A roll of the types of retroreflective sheeting described herein has a width bound by two longitudinal edges and a microstructured surface having an array of cube corner elements, e.g., defined by three mutually intersecting grooves. Depending on the orientation of the tool, one of the grooves may be substantially perpendicular, parallel, or at an angle between 0° and 90° to the longitudinal edge of the roll of retroreflective sheeting.

The following examples describe some exemplary constructions of various embodiments of the retroreflective sheetings, sealing films, and methods of making the retroreflective sheetings and sealing films described herein. The following examples are intended to be illustrative and are not intended to limit the scope of the present application. As such, the particular ingredients and amounts used as well as other conditions and details are not to be construed in a manner that would unduly limit the scope of this disclosure.

EXAMPLES

The following general procedure was used for Comparative Examples 1 and 2 and Examples 4 through 7: A retroreflective layer was prepared by (1) casting cube corner microstructures onto an overlay film (as described in U.S. Pat. No. 5,691,846 (Benson), incorporated herein by reference); and (2) a multi-layer sealing film was laminated to the cube corner microstructures. The specific multi-layer sealing films used and retroreflective constructions formed are described below.

Preparation of the Retroreflective Layer:

An overlay film was made by casting ethylene acrylic acid (EAA) copolymer (commercially available under the trade designation "Primacor 3440" sold by Dow Company of Midland, Mich.) at a film at a thickness of 0.01 cm (4 mil) onto a corona treated polyethylene terephthalate (PET) carrier measuring approximately 134.6 cm (53 in.) wide and 0.05 mm (0.002 in) thick. Pellets of EAA were fed into a 19 mm (0.75 in.) single screw extruder sold by C.W. Brabender Instruments Inc., South Hackensack, N.J. The extruder temperature profile was from 140° C. (284° F.) to 175° C. (347° F.), resulting in a melt temperature of about 175° C. (347° F.). As the molten resin exited the extruder, it passed through a horizontal die (sold under the trade designation "Ultraflex—40" by Extrusion Dies Industries LLC, Chippewa Falls, Wis.) and was cast onto the PET carrier described above. The PET carrier was traveling at approximately 36 meters/min (120 ft/min). The resulting molten overlay film on the PET carrier was run between a rubber roll and a chilled steel backup roll to solidify the molten resin into a layer. The EAA surface was corona treated at 1.5 J/cm².

The cube corner microstructures had three sets of intersecting grooves each having a pitch (i.e., primary groove spacing) of 0.0178 cm (0.007 in). The intersecting grooves formed a cube corner base triangle with included angles of 55.5°, 55.5°, and 69° resulting in the height of the cube corner elements being 76.2 microns (3.5 mil). The primary groove spacing is defined as the groove angle spacing between the grooves which form the two 55.5° base angles of the base triangle.

The cube corner microstructures were prepared using a resin composition formed by combining 25 wt-% bisphenol A epoxy diacrylate (sold under the trade designation "Ebecryl 3720" from Cytek, Woodland Park, N.J.), 12 wt-% dimethylaminoethyl acrylate ("DMAEA"), 38 wt-% TMPTA (trimethylol propane triacrylate), and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 25 fpm (0.127 m/s) onto a metal tool heated to 77° C. (170° F.). A rubber nip roller was used to fill the cavities of the embossed pattern on the tool and to minimize the amount of resin on the land area of the tool. A retroreflective layer was made by contacting the corona treated EAA film/PET carrier with the cube corner microstructures of the resin. The cube corner microstructure resin was cured through the PET carrier/EAA film on the tool with twelve Fusion D UV lamp (sold by Fusion Systems, Rockville, Md.) set at 600 W/in. Dichroic filters were used in front of the UV lamps to minimize IR heating of the construction. Upon completion of the curing process and removal of the retroreflective layer from the tool, the cube corner microstructures were irradiated by a Fusion D UV lamp operating at 50% to provide a post-UV irradiation cure. The retroreflective layer was passed through an oven set at 127° C. (260° F.) to relax the stresses in the film.

Next, retroreflective optical constructions were prepared by laminating the cube corner microstructure side of the retroreflective layer to a sealing films using a 30.48 cm (12 in) wide laminator composed of a rubber roll and a heated emboss roll with a hexagonal seal pattern. The specific sealing film construction used is described in each Example below. Lamination pressure ranged from about 700 psi to 1100 psi, and line speed was about 25 fpm. The retroreflective layer and sealing film were fed through the nip of the rolls of the laminator with the PET carrier side of the retroreflective layer placed against the heated emboss roll at temperatures ranging from about 121° C. (250° F.) to about 204° C. (400° F.). The PET carrier side of the sealing film contacted the heated rubber roll (46° C. (115° F.)).

Comparative Example 1

The multi-layer sealing film ("Comparative Sealing Film 1") was a two-layer construction of an acid/acrylate-modified ethylene vinyl acetate (EVA) polymer (sold under the trade designation "Bynel 3101" from Dow Corning, Mich., USA), prepared by coextrusion. The sealing film had a first layer that was clear and a second layer that was pigmented. Specifically, the second, pigmented layer was prepared by feeding pellets of Bynel 3101 mixed with 20% by weight of an 80/20 $TiO_2$/EVA blend into an extruder and casting it as a white film at a thickness of 0.005 cm (2 mil) onto a PET carrier. The first, clear layer was cast at a thickness of 0.002 cm (1 mil) and corona treated at an energy of about 1 J/cm². The corona treated side of the sealing film was brought in contact with the cube corner microstructures of the retroreflective layer prepared as described above. A retroreflective construction ("Construction 1") was prepared by laminating Comparative Sealing Film 1 to a retroreflective layer made as described above using a rubber roll with a Shore A hardness of 90, an emboss roll heated to 204° C. (400° F.), and a lamination pressure of 1000 psi.

Comparative Example 2

The sealing film ("Comparative Sealing Film 2") was prepared as described in Comparative Example 1, except that 10% of a gray pigment that includes EVA, carbon black, and $TiO_2$ was used in the second, pigmented layer. A retroreflective construction ("Construction 2") was prepared by laminating Comparative Sealing Film 2 to a retroreflective layer made as described above using a rubber roll with a Shore A hardness of 90, an emboss roll heated to 204° C. (400° F.), and a lamination pressure of 1000 psi.

Comparative Example 3

A commercially available prismatic retroreflective sheeting was provided (available under the trade designation "Diamond Grade 3910" from 3M Company, St. Paul, Minn.). This sheeting is referred to herein as "Construction 3."

Example 4

A sealing film ("Sealing Film 4") was prepared by combining the two-layer sealing film described in Comparative Example 1 with a third, polyolefin layer. A high-density polyethylene film was extruded onto the pigmented side of the two-layer sealing film at a thickness of 0.005 cm (2 mil) using a blown film extrusion process. A retroreflective construction ("Construction 4") was formed by laminating Sealing Film 4 to a retroreflective layer made as described above using a rubber roll with a Shore A hardness of 80, an emboss roll heated to 121° C. (250° F.), and a lamination pressure of 1100 psi.

Example 5

A sealing film ("Sealing Film 5") was prepared as described in Example 4, except that the polyolefinic third layer was polypropylene (PP). A retroreflective construction ("Construction 5") was formed by laminating Sealing Film 5 to a retroreflective layer made as described above using a rubber roll with a Shore A hardness of 90, an emboss roll heated to 135° C. (275° F.), and a lamination pressure of 1000 psi.

Example 6

A sealing film ("Sealing Film 6") was prepared by combining the two-layer sealing film of Comparative Example 1 and a third, polyester layer. Upon removal of the PET carrier of the two-layer sealing film, a 0.0001 cm (0.5 mil) thick primed PET layer (sold under the trade designation "Hostaphan RNK 2600 Primed C1S Polyester," by Mitsubishi Corporation, Middlesex, England) was heat laminated to the pigmented layer. A retroreflective construction ("Construction 6") was formed by laminating Sealing Film 6 to a retroreflective layer made as described above using a rubber roll with a Shore A hardness of 90, an emboss roll heated to 204° C. (400° F.), and a lamination pressure of 1000 psi.

Example 7

A sealing film ("Sealing Film 7") was prepared as described in Example 6, except that a 1.0 mil (0.002 cm) thick primed PET film was used. A retroreflective construction ("Construction 7") was formed by laminating Sealing Film 7 to a retroreflective layer made as described above using a rubber roll with a Shore A hardness of 90, an emboss roll heated to 204° C. (400° F.), and a lamination pressure of 1000 psi.

The elastic modulus of a sample of each of the retroreflective constructions described above was tested according to ASTM Test Method D882-09. Each sample measured 1 in (2.54 cm) wide by 5 in (12.7 cm) long. Each sample was mounted on tensile strength testing equipment (Sintech model commercially available from MTS Systems, MN) using a separation speed of 1 in/min (2.54 cm/min). The thickness of the retroreflective optical construction was measured using a gage. Flexural rigidity was calculated according to the formula below:

$$\text{Flexural Rigidity} = \frac{\text{modulus} \times \text{thickness}^3 \times \text{width}}{12}$$

The results of the thickness, elastic modulus, and flexural rigidity testing are shown in Table 1, below.

TABLE 1

Thickness, Modulus, and Flexural Rigidity

|  | Thickness (m) | Elastic Modulus (kPa) | Flexural Rigidity (N · m²) |
|---|---|---|---|
| Construction 1 | 0.00025 | 12.34 × 10⁴ | 0.4 × 10⁻⁸ |
| Construction 2 | 0.00025 | 7.45 × 10⁴ | 0.2 × 10⁻⁸ |
| Construction 3 | 0.00030 | 75.80 × 10⁴ | 4.3 × 10⁻⁸ |
| Construction 4 | 0.00030 | 18.34 × 10⁴ | 1.0 × 10⁻⁸ |
| Construction 5 | 0.00030 | 17.71 × 10⁴ | 1.0 × 10⁻⁸ |
| Construction 6 | 0.00028 | 32.06 × 10⁴ | 1.5 × 10⁻⁸ |
| Construction 7 | 0.00028 | 43.57 × 10⁴ | 2.0 × 10⁻⁸ |

The tensile strength of a sample of each of the retroreflective constructions described above was tested according to ASTM Test Method D882-09. Each sample measured 2 in (5 cm) wide and 5 in (12.7 cm) long and was tested using a speed of separation of 0.25 cm/min (0.1 in/min). Each sample was subjected to a pre-determined load which caused the sheeting to elongate. The coefficient of retroreflection (retroreflectivity) ($R_A$) was measured under these conditions and is reported in Table 2 below. The samples were allowed to relax for at least 1 min at room temperature between each load application. Retroreflectivity ($R_A$) was measured at two observation angles (0.2° and 0.5°), one entrance angle)(−4°, and two orientation angles (0° and 90°) using a hand-held retroluminometer (sold under the trade designation "GR 3" from Delta Controls, Houston). The coefficient of retroreflection is reported in Table 2 as an average of retroreflectivity measured at 0° and 90° orientation. Initial retroreflectivity (initial $R_A$) was measured when no load was applied to the sample (i.e., 0 lbs/in). Retroreflectivity under strain ($R_A$ under Strain) was measured when the sample was under strain.

TABLE 2

Initial $R_A$ and $R_A$ under Strain.

| | | Load (kg/m) | | | | | |
|---|---|---|---|---|---|---|---|
| | Observation/ Entrance (°) | 0 Initial $R_A$ (cd/ lux·m²) | 17.85 | 35.71 | 53.57 | 71.43 | 89.29 |
| | | | $R_A$ Under Strain (cd/lux·m²) | | | | |
| Construction 1 | 0.2/−4 | 470 | 422 | 274 | 156 | 120 | 79 |
| | 0.5/−4 | 341 | 308 | 260 | 183 | 144 | 97 |
| Construction 2 | 0.2/−4 | 531 | 311 | 224 | 144 | 97 | 77 |
| | 0.5/−4 | 388 | 284 | 247 | 172 | 111 | 96 |
| Construction 3 | 0.2/−4 | 442 | 407 | 391 | 363 | 353 | 384 |
| | 0.5/−4 | 403 | 401 | 381 | 355 | 351 | 385 |
| Construction 4 | 0.2/−4 | 548 | 517 | 536 | 519 | 488 | 401 |
| | 0.5/−4 | 409 | 352 | 340 | 307 | 295 | 286 |
| Construction 5 | 0.2/−4 | 766 | 705 | 678 | 632 | 630 | 587 |
| | 0.5/−4 | 602 | 474 | 427 | 368 | 328 | 320 |
| Construction 6 | 0.2/−4 | 579 | 590 | 571 | 569 | 528 | 478 |
| | 0.5/−4 | 441 | 377 | 352 | 334 | 309 | 294 |
| Construction 7 | 0.2/−4 | 385 | 433 | 408 | 389 | 373 | 396 |
| | 0.5/−4 | 313 | 335 | 311 | 292 | 280 | 272 |

Constructions 1 and 2 show a significant drop in $R_A$ at observation angles of 0.2 and 0.5 degrees when subjected to load levels of 35.71 kg/m and higher. Constructions 3-6 show good retention even at high load levels. A type III sheeting according to specification ASTM D 4956-09 requires a retroreflectivity of at least 250 cd/lux/m² for 0.2/−4 observation angle/entrance angle, and 150 cd/lux/m² for 0.5/−4 observation angle/entrance angle. When subjected to load levels greater than 35.71 kg/m, constructions 1 and 2 did not meet these requirements Strain level was determined by elongation of the samples when the targeted load level (e.g., 17.85, 35.71, 53.57, 71.43, and 89.29 kg/m) was reached. "% Strain" is the percent of elongation of the sample compared to the original length (i.e., before load application) and is shown in Table 3.

TABLE 3

% Strain.

| | % Strain at Load of 17.85 kg/m | % Strain at Load of 35.71 kg/m | % Strain at Load of 53.57 kg/m | % Strain at Load of 71.43 kg/m | % Strain at Load of 89.29 kg/m |
|---|---|---|---|---|---|
| Construction 1 | 0.70 | 1.52 | 2.74 | 4.48 | 7.70 |
| Construction 2 | 0.83 | 1.80 | 3.43 | 5.60 | 8.68 |
| Construction 3 | 0.08 | 0.14 | 0.20 | 0.26 | 0.34 |
| Construction 4 | 0.28 | 0.60 | 0.92 | 1.32 | 1.84 |
| Construction 5 | 0.26 | 0.50 | 0.98 | 1.40 | 1.95 |
| Construction 6 | 0.26 | 0.56 | 0.88 | 1.12 | 1.32 |
| Construction 7 | 0.16 | 0.32 | 0.46 | 0.64 | 0.76 |

Elongation at break (%) (i.e., elongation recorded at the moment of rupture of the sample) was measured using the tensile strength testing equipment and is reported in Table 4.

TABLE 4

Elongation at Break (%)

| Retroreflective Optical Constructions | Elongation at break (%) |
|---|---|
| Construction 1 | 146 |
| Construction 2 | 132 |
| Construction 3 | 10 |
| Construction 4 | 228 |
| Construction 5 | 434 |
| Construction 6 | 35 |
| Construction 7 | 34 |

Solvent resistance was also tested on samples measuring 1.27 cm (0.5 in) wide. Paper towels saturated with methyl ethyl ketone (MEK) were placed in a container. A sheet of metal foil was placed on the paper towels. The samples were placed in the container with the sealing film side of the retroreflective optical construction in contact with the metal foil. The container was then placed in a plastic enclosure to retain organic vapors. The samples were exposed to MEK vapors for 30 minutes. The samples were subsequently placed on a table with the sealing film contacting the table, and curvature was measured in the cross-web direction (CW) and in the down-web direction (DW) using the curl gauge described in the paper "Measurement of Web Curl" published in the Proceedings of the Applied Webhandling Conference, AIMCAL 2006, which is incorporated herein by reference. The procedure was repeated for a different set of samples, except that the duration of the exposure to MEK vapors was 24 hours. Initial curvature, curvature after 30 minutes of solvent exposure, and curvature after 24 hours of solvent exposure are shown in Table 5.

TABLE 5

Initial Curvature, Curvature after 30 minutes, and Curvature after 24 Hours.

| | Direction of measurement | Initial curvature (mm) | Curvature after 30 min (mm) | Curvature after 24 hours (mm) |
|---|---|---|---|---|
| Construction 1 | CW | −1 | −1.5 | −3 |
| | DW | −17 | >−50 | >−50 |
| Construction 4 | CW | −3 | −0.5 | −2 |
| | DW | −1.5 | −3 | −3 |
| Construction 5 | CW | 2 | 6.5 | 16 |
| | DW | −4 | −4.5 | 9 |

Negative curvature values as shown in Table 5 indicate that the sheeting curved upwards, (i.e., toward the overlay film); positive curvature values indicate that the sheeting curved downwards (i.e., towards the table). An average curvature of each construction can be calculated by averaging the down-web and crossweb measurements.

Elastic modulus and thickness of each sealing film layer was measured as described above and are shown in Table 6, below.

TABLE 6

Thickness and Elastic Modulus

| Sealing Film Layers | Thickness (m) | Elastic Modulus (kPa) |
|---|---|---|
| Comparative Sealing Film 1 | 0.00007 | 0.41 × 10⁵ |
| Comparative Sealing Film 2 | 0.00007 | 0.25 × 10⁵ |
| Sealing Film 4 | 0.00005 | 8.55 × 10⁵ |
| Sealing Film 5 | 0.00005 | 10.96 × 10⁵ |
| Sealing Film 6 | 0.00001 | 38.19 × 10⁵ |
| Sealing Film 7 | 0.00002 | 38.19 × 10⁵ |

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations to the embodiments of the present disclosure will become apparent to those skilled in the art without departing from the spirit and scope of the disclosure. The scope of the present application should, therefore, be determined only by the following claims.

What is claimed is:

1. A retroreflective article, comprising:
a plurality of cube corner elements; and
a multi-layer sealing film at least a portion of which is adhered to at least some of the plurality of cube corner elements such that the multi-layer sealing film maintains an air interface between the cube corner elements and the multi-layer sealing film, wherein the multi-layer sealing film includes:
a first sealing film layer comprising a thermoplastic polymeric material including reaction products of alkylene in an amount of at least about 50% by weight and reaction products of at least one non-acidic comonomer in an amount of less than about 25% by weight; and
a second sealing film layer including at least one of a polypropylene and high density polyethylene; wherein at least one of the first sealing film layer and the second sealing film layer has an elastic modulus that is between about $3.5\times10^5$ kPa and about $50\times10^5$ kPa, and wherein the flexural rigidity of the retroreflective article is between about $1.0\times10^{-8}$ N·m² and about $4.0\times10^{-8}$ N·m².

2. The retroreflective article of claim 1, further including:
a third sealing film layer comprising at least one of
a thermoplastic polymeric material including reaction products of alkylene in an amount of at least about 50% by weight and reaction products of at least one non-acidic comonomer in an amount of less than about 25% by weight; and
a polyolefin, a polyester, a polymethyl methacrylate, a polyamide, a polycarbonate, an ethylene-methacrylic acid, and a polyurethane.

3. The retroreflective article of claim 2, wherein one of the second sealing film layer and third sealing film layer further includes about 5 wt-% to about 30 wt-% of an opacifying agent.

4. The retroreflective article of claim 1, further comprising:
a polymeric, light transmissive body layer having an elastic modulus of less than about $3.5\times10^8$ Pa.

5. The retroreflective article of claim 1, further comprising:
a layer selected from the group consisting essentially of (1) a land layer having a thickness that is between about 0 micrometers and about 250 micrometers and (2) a body layer having a thickness that is less than about 1000 micrometers.

6. The retroreflective article of claim 1, wherein the retroreflective article has a coefficient of retroreflection of at least about 250 cd/lux/m² at a 0.2° observation angle and a −4° entrance angle when subjected to a load of about 53 kg/m.

7. The retroreflective article of claim 1, wherein the retroreflective article has a coefficient of retroreflection of at least about 150 cd/lux/m² at a −4° entrance angle, and a 0.2° observation angle.

8. The retroreflective article of claim 1, wherein the retroreflective article has a curvature of less than about 50 mm in a downweb direction when subjected to residual solvent vapors for at least about 30 minutes.

9. The retroreflective article of claim 8, wherein the curvature is less than about 20 mm.

10. The retroreflective article of claim 1, wherein the retroreflective article has an average curvature of less than about 50 mm when subjected to residual solvent vapors for at least 30 minutes.

11. The retroreflective article of claim 1, wherein the thermoplastic polymeric material is at least one of acid modified, anhydride modified, carbon monoxide modified, and combinations thereof.

12. The retroreflective article of claim 1, wherein the non-acidic comonomer is at least one of vinyl acetate, alkyl (meth) acrylate monomers, and mixtures thereof.

13. The retroreflective article of claim 1, further including:
a third sealing film layer whose composition is essentially the same as one of the first or second sealing film layers.

14. A multi-layer sealing film, comprising:
a first sealing film layer comprising a thermoplastic polymeric material including reaction products of alkylene in an amount of at least about 50% by weight and reaction products of at least one non-acidic comonomer in an amount of less than 25% by weight; and
a second sealing film layer including at least one of a polypropylene and high density polyethylene;
wherein at least one of the first sealing film layer and the second sealing film layer has an elastic modulus that is between about $3.5\times10^5$ kPa and about $50\times10^5$ kPa, and wherein the multi-layer sealing film is configured to impart a flexural rigidity between about $1.0\times10^{-8}$ N·m² and about $4.0\times10^{-8}$ N·m² to a retroreflective article comprising the multi-layer sealing film.

15. The multi-layer sealing film of claim 14, wherein at least a portion of the multi-layer sealing film is adhered to at least a portion of a microstructured surface including a plurality of cube corner elements, the multi-layer sealing film maintaining an air interface between the cube corner elements and the multi-layer sealing film.

16. The multi-layer sealing film of claim 14, further comprising:
a third sealing film layer comprising a thermoplastic polymeric material including reaction products of alkylene in an amount of at least about 50% by weight and reaction products of at least one non-acidic comonomer in an amount of less than about 25% by weight.

* * * * *